Sept. 12, 1939.  W. A. RAY  2,173,083
THERMOSTAT
Filed Aug. 3, 1937
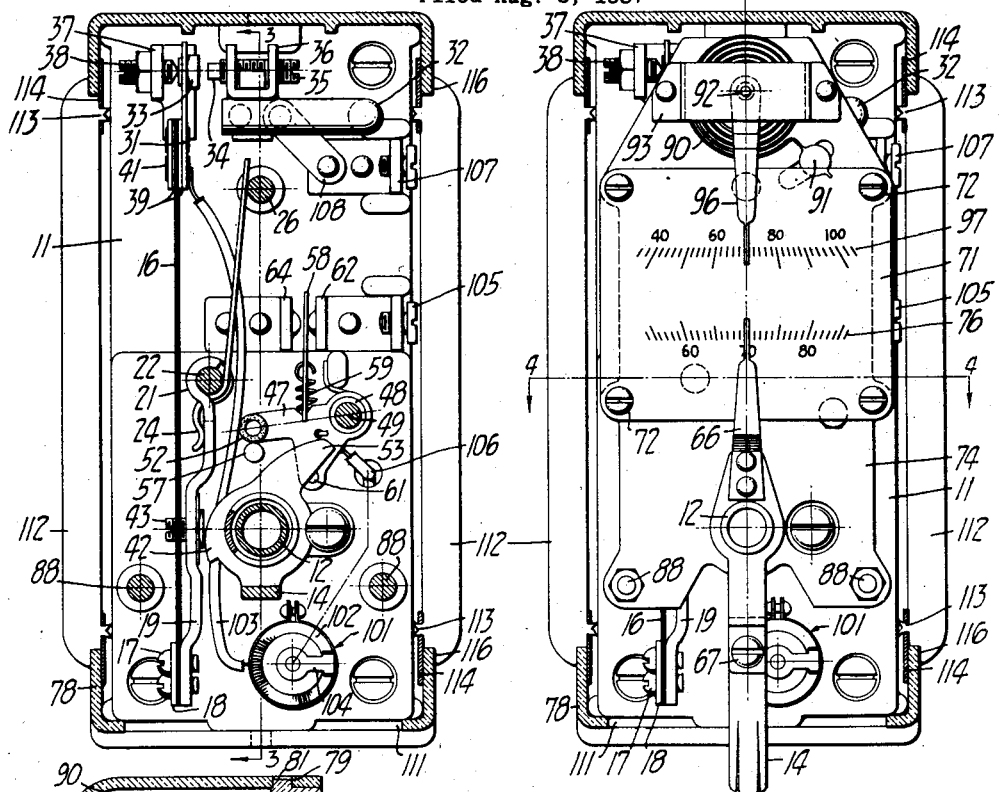
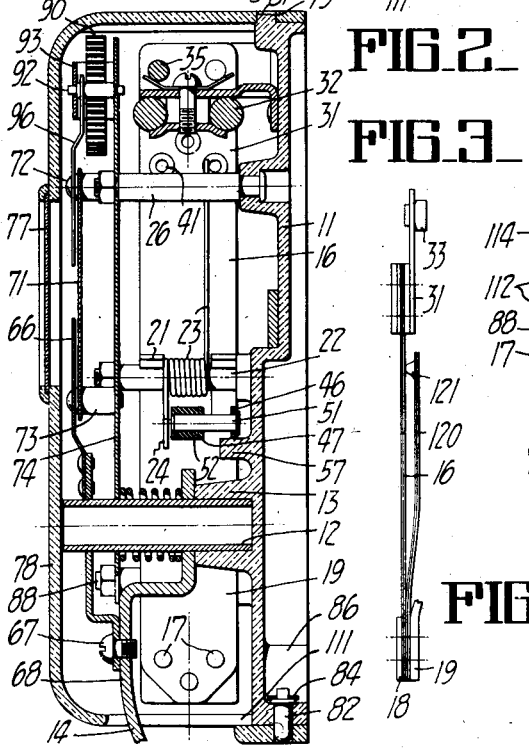
INVENTOR.
William A. Ray
BY Robert H. Eckhoff
ATTORNEY.

Patented Sept. 12, 1939

2,173,083

UNITED STATES PATENT OFFICE 2,173,083

THERMOSTAT

William A. Ray, San Francisco, Calif., assignor to General Controls Company, a corporation of California Application August 3, 1937, Serial No. 157,126

9 Claims. (Cl. 200—139)

This invention relates to a thermostat, particularly one for use to control operation of a heat supply means in a domestic installation.

In household heating, one will ordinarily adjust a thermostat to maintain a definite temperature. This temperature is ordinarily not uniform between each installation, each householder adjusting the thermostat to suit himself and the temperature range will extend between 60° and 80° F., the more usual installations operating at about 68° or 70° F. The householder really operates the heating system, not upon a definite temperature, but upon his own sensation as to comfort. Equipment manufacturers find it necessary because of demand to provide a temperature indicating means, as a thermometer, upon the thermostat indicative of the space temperature adjacent to the thermostat. Typical showings of this are to be found in the Stewart Patent 1,961,-649 of June 5, 1934, and the Heinz Patent 1,520,-496 of December 23, 1924. This indicating means has usually been in the form of a thermometer made of glass. Because of poor heat conductivity of glass there is a considerable thermal time delay in establishing the thermometer at the actual room temperature so that the thermometer will indicate a lower temperature than that actually existing in the surrounding space. This confuses the householder and causes complaints, because the space, while comfortable, will be indicated as having a temperature lower than that at which the householder considers he could be comfortable. In accordance with this invention, an accurate temperature indicating means is provided which is quickly responsive to changes in space temperature and provides an accurate indication thereof with little, if any, time lag.

The heating means ordinarily used in domestic heating installations are ordinarily such that even though the primary heat supply means, the burner, is cut off the supply of heat continues for some time due to the heat stored in the furnace. This causes the space temperature to overrun that desired, an uneconomical and an unpleasant result. In my prior application, Serial No. 39,-728, filed September 9, 1935, I have proposed a method of operation which involves supplying auxiliary heat to the thermostat in accordance with the anticipated return of temperature to normal. More specifically, I have proposed heating the thermostat with a heating means which supplies heat at a rate corresponding to the instantaneous position of the control means, for example, a fuel supply control valve. In this way, the heat supply means is coordinated and is cut out, not prematurely, but in advance of actual attainment of the desired temperature in the space so that heat stored in the heat supply means is utilized to carry the temperature up to that desired. In accordance with this invention supplemental heating means are provided which affect the bimetal element in the thermostat but which do not introduce any serious error into the operation of the temperature indicating means provided in association with the thermostat.

During many periods of the year it is desirable that the heat supply means be entirely cut off even though the temperature drops to a point below that at which the heat supply means would ordinarily be cut in. Accordingly, it is not unusual to provide a supplementary switch superimposed in control over the thermostat and preventing operation under control of the thermostat. In the structure of the present invention I have provided such a switch which is so coordinated with the thermostat that a single operating means is provided for each, that is, for the thermostat and the switch, this single operating means enabling manual superimposing of the switch over the thermostat control.

The invention includes other features of advantage and other objects, some of which, together with the foregoing, will appear hereinafter wherein the present preferred form of thermostat construction is disclosed.

In the drawing accompanying and forming a part hereof,

Figure 1 is a plan view, partly in section, showing the assembly of the present thermostat.

Figure 2 is a section taken through the structure shown in Figure 1 illustrating further details of the construction.

Figure 3 is a section taken along the lines 3—3 of Figure 2.

Figure 4 is a section taken along the lines 4—4 of Figure 1.

Figure 5 is a fragmentary view of another form of bimetal unit construction.

In the thermostat construction of the present invention, I provide a molded base structure generally indicated at 11. This base is molded of a suitable molding composition. A post 12 is molded into an extension 13 on the base. The post serves as a support for a thermostat adjusting arm 14.

The thermostat includes the usual bimetal operating strip element 16. This element is rigidly secured at one end by screws 17 and plate 18 to an end of a support member 19. The support member, at its other end, is forked at 21 and the forked ends are arcuately shaped to fit around post 22 secured to the base 11. A spring 23 is placed upon the post and one end 24 thereof bears upon member 19 while the other engages a post 26 on the base to retain member 19 in place and at the same time to urge it in a counter-clockwise direction around post 22.

The other end of the bimetal strip carries a magnetic member 31 for cooperation with a fixed magnet 32. The magnetic bias on the strip insures that the strip will not move from one position to another without a definite snap, an action desirable in the making and breaking of a circuit by contacts. Magnetic strip 31 carries contact 33 cooperating with a movable contact 34 positioned on the end of screw 35. The magnet 32 and the screw 34 are carried in a support structure indicated generally at 36 and carried in the base. A member 37 is positioned opposite to the structure 36 on the base. Member 37 includes an adjusting screw 38 to enable the extent of movement of the bimetal strip to be varied.

The magnetic strip 31 is carried upon the end of the bimetal strip 16, suitable insulation strips 39 being interposed between the two strips to ensure that contact heat (heat developed in the contacts on breaking the circuit) is not carried down into the bimetal strip while rivets 41, utilized to secure the members together, are hollow to permit air circulation and to reduce the rate of heat transmission into the bimetal strip, as disclosed in my prior Patent No. 2,066,738 of January 5, 1937.

To permit the operating range of the bimetal strip to be varied, operating member 14 is provided with a cam 42. This engages an end of adjusting screw 43 carried in member 19, the adjusting screw being provided so that the strip, and its relation to the cam 42, can be varied for calibration purposes. Rotation of member 14 in a clockwise direction is effective to move member 19 in a clockwise direction whereby the bimetal strip is moved and contact 33 maintained in engagement with contact 34 until a higher space temperature is attained. Conversely, counter-clockwise movement of member 14 and member 19 results in a lowering of the temperature to which the bimetallic element is responsive.

In accordance with this invention, member 14 is utilized as an operating member for a switch superimposed electrically in control over the bimetal strip. This switch includes two members 46 and 47 mounted upon an insulating bushing 48 carried upon a post 49. The members also carry a pin 51 which extends between the members and supports the roller 52. Roller 52 is engaged by a projection 53 upon member 14 whereby the members are rotated in a clockwise direction about post 49 against the urge of a spring 56 carried upon the post and urging the members in a counter-clockwise direction to engage stop 57 upon the base. A switch blade 58 is mounted upon members 46 and 47 and is held in position between the members by a spring 59 extending between member 58 and a pin 61 carried between members 46 and 47. The normal position of the switch is that in which it appears in Figure 2, switch blade 58 being against fixed contact 62. However, upon clockwise rotation of members 46 and 47 by counter-clockwise movement of member 14, members 46 and 47 are rotated until member 58 moves to the left of Figure 2 by reason of a toggle action between blade 58 and members 46 and 47. The pin 61 is moved to lengthen the spring 59 and cause arm 58 to snap over to engage stop 64. So long as switch blade 58 is in engagement with contact 62, a circuit to contacts 33 and 34 can be completed. However, upon movement of the arm 14 in a counter-clockwise position, until indicator arm 66, carried by member 14, indicates the "off" position, the switch blade moves over to engage stop 64. The indicator element 66 is secured by screw 67 to offset portion 68 of operating member 14.

A temperature indicating dial was provided by plate 71. This plate is positioned by screws 72 and collars 73 upon a metal backing plate 74, to be presently described in detail. As appears in Figure 1, the plate 71 is suitably marked with a scale 76 cooperating with the indicating member 66. The scale is visible through a window 77 provided in case 78. Case 78 is normally molded of a suitable molding composition and is provided with an aperture 79 at one end thereof to receive an extension 81 on the base. This retains one end of the case in position, the other end of the case being held by a slidable pin 82 extending through an aperture in the case from the base structure 11. The pin is urged into that position in which it appears in Figure 3 by a flat metal spring 84 which extends between projections 86 on the base, the projections being fitted to retain the ends of the flat spring.

The flat plate 74 is positioned above the bimetal element and substantially coextensive with a major portion of the base, the plate being positioned by posts 88, 22, 26 and 49 carried and extending upwardly from base 11. This plate provides a heat collection means for a temperature indicating element. The temperature indicating element includes a spirally wound bimetallic member 90 having one end thereof attached to a movable post 91 to permit of adjustment and the calibration of the indicating means. The other end of the spirally wound member is attached to a rotable member 92 positioned between plate 74 and a U member 93 secured by suitable rivets to plate 74. Rotatable member 92 carries an indicator arm 96 which depends therefrom and cooperates with a scale 97 provided upon plate 71.

A heating element, indicated generally at 101, is mounted upon the base. This heating element supplies auxiliary heat to the bimetal strip in accordance with the rate of operation of the heat supply means so that the return of the bimetal strip is in accordance with the anticipated return of the space temperature to normal. The heating element includes a base structure carrying a heating element 102. One end of the element is connected by wire 103 to member 31. A movable arm 104 is provided upon the base structure and wire 106 extends from this to members 46 and 47. The quantity of heat supplied can be adjusted by varying the position of arm 104. External connection with the thermostat is made to fixed contact 62, a binding post 105 being provided thereupon. The other external contact is made to binding post 107 connecting 108 to support structure 36 carrying the contact 34.

It is to be noted that the case provided above the thermostat is relieved as at 111 so that free atmospheric access is available while the sides of the case are open and only covered by louvres indicated generally at 112 (more particularly shown in my design patent, Des. 103,433 of March 2, 1937. The louvres are metal strips secured by lugs 113 to plates 114, the ends of the metal strips being recessed as at 116 to position the louvres on the sides of the case.

In Figure 5 I have shown a modified form of bimetallic element ordinarily useful where considerable current must be broken. As appears in this structure, bimetal strip 16 is provided and is held in the same manner as in Figure 2 except that another strip 120 is also held by screws 17. Screws 17 secure the two strips together securely at one end thereof. Adjacent to the other end of the strips they are held apart and a simple means for accomplishing this is to provide a projection 121 upon strip 120 although this projection can be provided upon strip 16 or can be provided by other means as a ball interposed between the two strips. This structure, I have found, enables a bimetal structure to be successfully provided which structure is capable of operating satisfactorily upon full line voltage of 110 volts. The structure has sufficient inherent power to make and break the circuit without undue arcing at the contacts.

I claim:

1. In a device of the character described, a bimetallic element movable between an "on" and an "off" position in response to a space temperature to control supply of heat, a normally closed switch superimposed in control over said element, and means for varying the position of said element to vary the temperatures to which said element is responsive over a temperature range, said means including a cam element rotatable in engagement with said element for moving said element to any desired position throughout said range and rotatable to an extreme position at one extreme of said range to engage and open said normally closed switch.

2. In a device of the character described, a normally vertical base, a bimetallic element positioned vertically on said base and movable in a vertical plane between an "on" and an "off" position, a flat metal plate positioned vertically and parallel to said base, means supporting said plate above said base, and a heating element on said base and between said base and said plate and adjacent the lower end of said vertical base and said element.

3. In a device of the character described, a base, a bimetal element movable between an "on" and an "off" position on said base, a post on said base, a cam rotatable on said post in engagement with said element to move said element to vary its temperature response over a range, and a switch on said base engaged and operable by said cam upon movement thereof at one end of said range.

4. In a device of the character described, a fixed support, a first bimetal strip, a fixed contact, a contact carried by said first strip cooperatively with respect to said fixed contact, a second metal strip positioned and remaining substantially parallel to said first strip in all positions of said first strip, means securing said strips together on said support at one end thereof, and means positioned between said strips adjacent the other end thereof spacing said strips a substantially constant distance apart at all times.

5. In a device of the character described, a fixed support, a first bimetal strip, a fixed contact, a contact carried by said first strip cooperatively with respect to said fixed contact, a second metal strip positioned and remaining substantially parallel to said first strip in all positions of said first strip, means securing said strip together on said support at one end thereof, and a projection extending from one of said strips adjacent the other end thereof spacing said strips a substantially constant distance apart at all times.

6. In a device of the character described, a fixed support, a first bimetal strip, a fixed contact, a contact carried by said first strip cooperatively with respect to said fixed contact, a second metal strip positioned and remaining substantially parallel to said first strip in all positions of said first strip, means securing said strips together on said support at one end thereof, and a projection extending from said second of said strips adjacent the other end thereof spacing said strips a substantially constant distance apart at all times.

7. In a thermostat, a base, a cover for said base having a top portion spaced from said base, opposite sides on said cover being apertured to pass air freely, a metal plate substantially coextensive with said base and supported between the base and said top portion in a spaced substantially parallel relation to said base and to said portion, and a flat bimetallic element supported between said plate and said base and movable in a plane parallel to that of said base and said plate and preventing free air circulation between said opposite sides, said base and said plate.

8. In a thermostat carrying a room temperature indicating device, the combination of a base, an outer apertured shell on said base providing a cover therefor, a fixed contact, a bimetal element mounted within the confines of said cover carrying a contact cooperating with said fixed contact to control current flow, and a metal plate mounted in a spaced relation between said bimetal element and said shell and substantially parallel to said shell to dissipate quickly any heat generated by said contacts.

9. In a thermostat carrying a room temperature indicating device, the combination of a base, an outer apertured shell on said base providing a cover therefor, a fixed contact, a bimetal element mounted within the confines of said cover carrying a contact cooperating with said fixed contact to control current flow, and a metal plate mounted in a spaced relation between said bimetal element and said shell and providing a support for said temperature indicating device, said plate being substantially parallel to said shell to dissipate quickly any heat generated by said contacts.

WILLIAM A. RAY.